(12) United States Patent
Kelley et al.

(10) Patent No.: US 7,263,721 B2
(45) Date of Patent: Aug. 28, 2007

(54) PASSWORD PROTECTION

(75) Inventors: Edward Emile Kelley, Wappingers Falls, NY (US); Wayne Anthony McAuliffe, Bexley (AU)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 10/217,352

(22) Filed: Aug. 9, 2002

(65) Prior Publication Data

US 2004/0030914 A1    Feb. 12, 2004

(51) Int. Cl.
*G06F 11/00* (2006.01)

(52) U.S. Cl. .......................... 726/23; 726/24; 705/51; 705/54; 713/189; 713/190

(58) Field of Classification Search .................. 726/23, 726/24; 713/188
See application file for complete search history.

(56) References Cited

U.S. PATENT DOCUMENTS

| 4,672,572 | A |   | 6/1987  | Alsberg |         |
|-----------|---|---|---------|---------|---------|
| 5,623,597 | A |   | 4/1997  | Kikinis |         |
| 5,623,600 | A | * | 4/1997  | Ji et al. | 726/24 |
| 5,832,214 | A |   | 11/1998 | Kikinis |         |
| 5,896,497 | A |   | 4/1999  | Halstead |        |
| 5,944,824 | A |   | 8/1999  | He      |         |
| 6,006,328 | A | * | 12/1999 | Drake   | 726/23  |
| 6,052,780 | A |   | 4/2000  | Glover  |         |
| 6,108,786 | A |   | 8/2000  | Knowlson |        |
| 6,141,774 | A |   | 10/2000 | Mattheis |        |
| 6,151,624 | A | * | 11/2000 | Teare et al. | 709/217 |
| 6,338,141 | B1 | * | 1/2002 | Wells   | 726/24  |
| 6,584,569 | B2 | * | 6/2003 | Reshef et al. | 726/25 |
| 6,611,925 | B1 | * | 8/2003 | Spear   | 714/38  |
| 6,647,400 | B1 | * | 11/2003 | Moran  | 707/205 |
| 6,735,702 | B1 | * | 5/2004 | Yavatkar et al. | 726/13 |
| 6,952,776 | B1 | * | 10/2005 | Chess  | 713/188 |

FOREIGN PATENT DOCUMENTS

JP          64-76397       3/1989

\* cited by examiner

*Primary Examiner*—Kambiz Zand
*Assistant Examiner*—Roderick Tolentino
(74) *Attorney, Agent, or Firm*—Anthony V. S. England; William Steinberg

(57) ABSTRACT

Defeating the ability of malicious code to record password entries made at a keyboard involves one or two separate strategies. In a first reactive strategy, a protection process executes on a protected machine by determining any processes that hook keyboard messages, and deleting identified modules that correspond with suspected processes. A second proactive strategy further involves attempting to cripple the suspected processes by locating a suspect process' entry point and writing a subroutine return opcode to this suspect process. Further, there is a separate watchdog process, which monitors the dummy keyboard-hook process. This watchdog process runs checksums on the dummy keyboard-hook process and tests its position in the keyboard-hook process chain to ensure that the dummy process is not compromised.

20 Claims, 10 Drawing Sheets

PASSWORD PROTECTION

FIELD OF THE INVENTION

The present invention relates to password protection, and relates more specifically to shielding keyboard-entered passwords from malicious code.

BACKGROUND

Microsoft Windows™ computer operating systems are vulnerable to security breaches whenever the operating system prompts for keyboard input of a password. Security breaches are possible as the networking facilities of the Windows™ operating system, and networking facilities of most networking clients, typically use dialog boxes for entering passwords via a keyboard.

These dialog boxes are generated with the assistance of the Windows™ operating system and, when used, visually mask keyboard input that the user types to gain access to a server network or other protected medium. This masking mechanism provides immediate visual security, but does not address security risks within the operating system.

Keyboard keystrokes exposed to the operating system can be monitored by malicious or opportunistic software that observes system-wide keyboard entries and passes all keystrokes (that is, virtual keycode) to a dedicated "spy" process.

Such a spy process can determine a sequence of keystrokes entered at a given password prompt, and capture these keystrokes for subsequent unauthorized network logins. Captured keystrokes can also be transmitted to a remote location via the Internet or other network.

Coventionally, there are a variety of computer security systems as following.

Knowlson's U.S. Pat. No. 6,108,786 discloses a monitor network bindings, which detects when an unauthorized protocol has binding to an adapter, and an alert is generated when such a binding is detected.

Glover's U.S. Pat. No. 6,052,780 discloses accessing and restricting access to information, and notes that a file driver may hook into the operating system to monitor traffic and capture code.

Alsberg's U.S. Pat. No. 4,672,572 discloses a protector system for computer access and use, wherein communications are monitred via a security server.

Mattheis' U.S. Pat. No. 6,141,774 discloses a peripheral device with access control, which utilizes a watchdog timer to monitor malfunction.

Japanese Published Unexamined Patent Application No. 64-76397 discloses a peripheral device with access control, which monitors a cable connection, and erases a password if abnormality is detected.

Kikinis' U.S. Pat. Nos. 5,623,597 or 5,832,214 discloses a security for entered passwords, which is provided by diverting password keystrokes from a keyboard to a special boot controller, with bypassing the keyboard controller (a keyboard interpreter) to a computer bus.

Halstead's U.S. Pat. No. 5,896,497 discloses a system for securing a computer in which the system provides a hook key and mouse event in which the system detects mouse or keyboard operation.

He's U.S. Pat. No. 5,944,824 discloses a system and method for single sign-on to a plurality of network elements, which includes password protection to counter eavesdropping threats.

Drake's U.S. Pat. No. 6,006,328 discloses a computer software, authentication, protection and security system, which is concerned eavesdropping, such as the monitoring of keyboard.

The prior references, as recited above, do not recite the feature of protecting password entries from being monitored by malicious code, which monitors to detect malicious code such as that which would implement a keyboard hook in order to pass the entered keystrokes etc. to a "spy" process.

SUMMARY

A set of software processes is described for defeating the ability of malicious code to record password entries made at a keyboard.

By contrast, neither the Windows™ operating system, nor current virus scanning programs, actively check or monitor password input routines for the possibility of opportunistic software that may monitor and record password entries. The described method of password protection incorporates two separate but related techniques that provide respectively "reactive" and "proactive" responses to inappropriate monitoring of keyboard entries.

These two techniques embody the same core protection algorithm, but differ in their implementation. The reactive technique runs exclusively on the machine to be protected, and cannot defend against external attack or disablement by malicious code. The proactive technique runs on both a server and on the machine (or machines) to be protected, and monitors any tampering or interference by the malicious code.

In a first (reactive) technique, a background program is periodically run on the client to determine if any of the keyboard-hooking programs are not on the audit list (a snapshot file taken during installation). If any of the keyboard-hooking programs are not found on the audit list or, alternatively, if a hooking process is identified to match any known malicious modules in a hit list (a file maintained by the program in which previously encountered malicious processes are listed), the program is deleted and the user is notified to take further action such as rebooting and changing the passwords.

A second (proactive) technique has a server which loads a watchdog process, dummy hook process, and name-list array to the client. Both the dummy hook process and the watchdog process use a name-list array to identify all of the acceptable keyboard-hooking processes and their checksums. An audit list is formed during installation to "snapshot" the current hook process list for comparison purposes later. Both the dummy hook process and the watchdog process periodically compare the list of keyboard-hooking processes with the audit list for any discrepancies by running checksums, and comparing all of the keyboard-hook processes (including the dummy keyboard-hook process) with the stored checksums. Further, these processes observe if any hooked process matches the list of malicious programs in a previously stored hit list.

The watchdog process also notes the order of the keyboard-hook processes. The dummy keyboard-hook process installs itself at the end of the list of keyboard hook processes, and the watchdog process ensures that no other keyboard-hook processes are installed after the dummy keyboard-hook process.

If unauthorized processes are detected or authorized processes have been changed, then the processes are removed. Identified details of the malicious process are stored in the hit list. The watchdog process sends a message to the dummy keyboard-hook process and expects a response indicating that the dummy keyboard-hook process has been successfully installed.

In summary, the first technique has a vulnerable monitoring module and no name-list array, whereas the second technique uses a server-deployed name-list array and a watchdog module to safeguard the monitoring module.

DETAILED DESCRIPTION

The operation of malicious code is first described, followed by a description of reactive and proactive techniques for preventing such malicious code from capturing password entries.

Malicious Code

Figure 1:
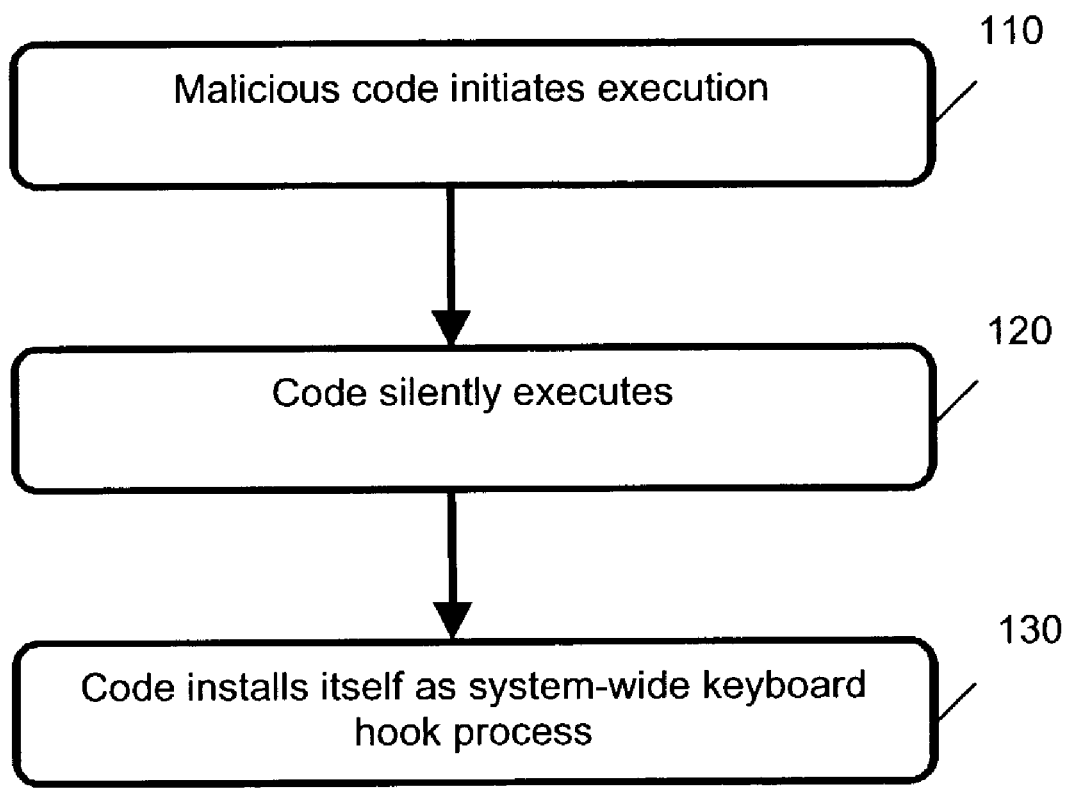
FIG. 1 is a flowchart representing steps involved in a malicious code infiltrating a computer environment to record password entries.

FIG. 1 represents steps involved when malicious code installs itself on computing hardware. In step 110, malicious code initiates execution. In step 120, the code executes unobserved by the user. In step 130, the malicious code installs itself as a system-wide keyboard hook process. As a system-wide keyboard hook process, the malicious code can thereby monitor keyboard entries, such as passwords.

Figure 2:
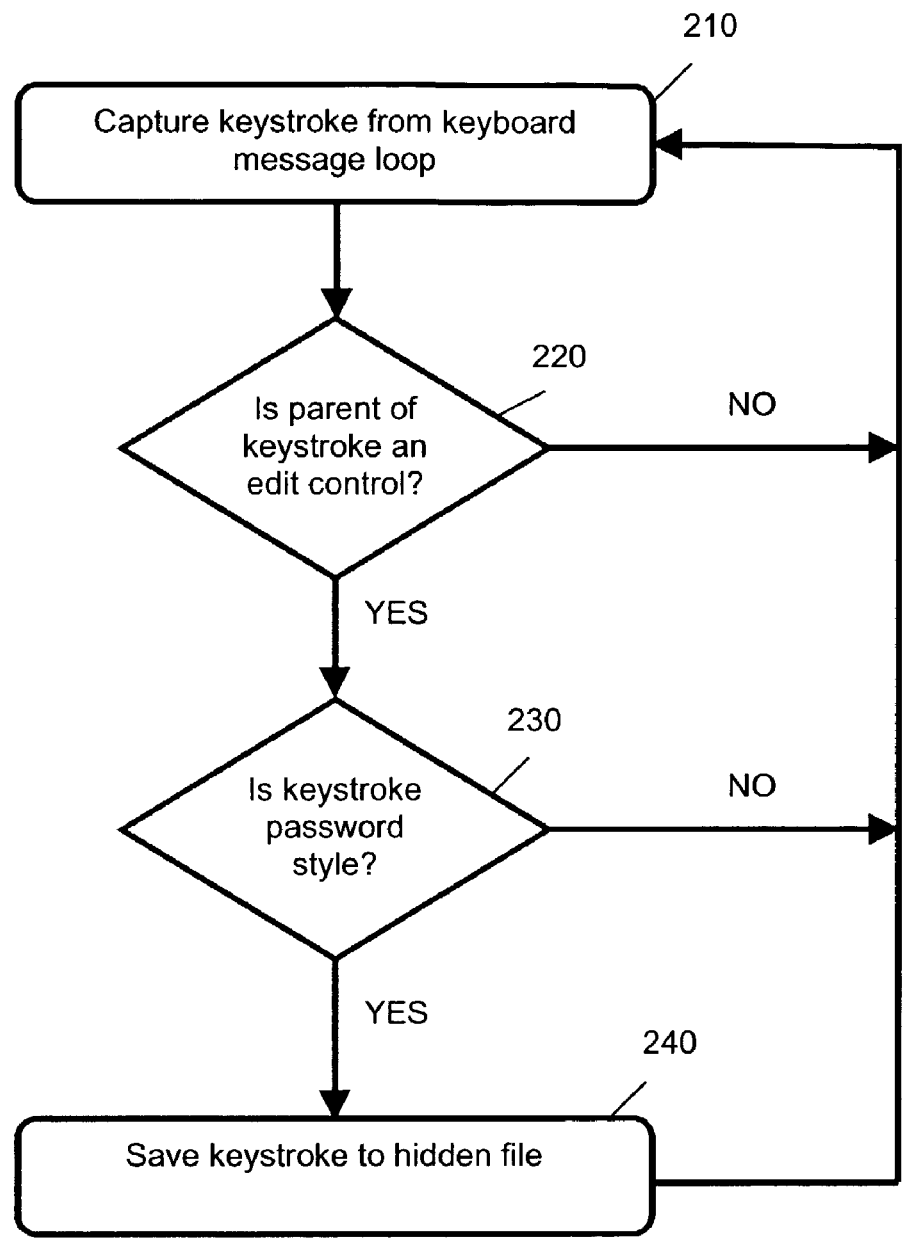
FIG. 2 is a flowchart representing steps involved in a malicious code captures password entries from an operating system on which the code is installed.

FIG. 2 represents how malicious code operates. In step 210, the malicious code captures keystrokes from the keyboard message loop. The keyboard message loop refers to cyclic processing of keystrokes that the operating system keyboard driver receives. Received characters are posted (by their virtual keycode value) to a dispatcher. A dispatcher in a multithreaded operating system such as Microsoft Windows™ makes these "keyboard messages" available, on a system-wide basis, to user software by permitting participation in the processing cycle.

User software "hooks" into the loop, to test and manage keystrokes of interest and pass control to the next (if any) process hooked in the loop. The operating system offers such a mechanism to allow programmers to rapidly process certain key sequences (for example, application-specific "hot keys") or modify the behavior of a keystroke (for example, to allow the entry of a language-specific "accent" to appear for a character, based on a second keystroke).

Some real-time debuggers and computer-based training programs make legitimate (that is, non-malicious) use of the keyboard message loop to enable them to "see" keystrokes before any other software. Mouse messages have their own distinct "message" loop, where X-Y movements and button actions are queued for processing.

In step 220, a determination is made whether a captured keystroke has a parent that is an edit control. A "control", in Microsoft Windows™ API parlance, is the name given to any element in a graphical environment that interacts with the user and performs an action, passing data to the programmer for testing, comparison or storage purposes. An "edit control" is defined as a text box, or input field, where keyboard entries may be typed.

Normally the programmer has access only to the characters thus entered in such an edit control realized by their own code, and is not privy to any controls (or messages for that matter) owned by neighboring processes/software.

Only by processing keyboard messages directly is this "limitation" traversed. Opportunistic software can determine the source of a keystroke and the style of the control, which initially captured the keystroke, by installing a system message hook process, which is called after any input event. By tearing down the message packet, this process can determine the handle to the window owning the input (the parent).

The opportunistic code can then determine if the control is an "edit" type having the password attribute input style. The password attribute input style replaces keystroke entries with an asterisk as they are typed, but returns the entered keycodes to the owner of the control without any masking. If the parent of the captured keystroke is not an edit control, processing returns to step 210, to capture further keystrokes. Otherwise (if the parent of the captured keystroke is an edit control), processing proceeds in step 230.

In step 230, a determination is made whether the captured keystroke is of "password style". If the captured keystroke is not of a password style, processing returns to step 210 to capture further keystrokes. Alternatively, if the keystroke is a password style, the captured keystroke is saved to a hidden file in step 240. After step 240 is performed, processing returns again to step 210 to capture further keystrokes. The malicious code operates according to these described steps of FIG. 2, until processing is interrupted or the code is aborted.

Figure 3:
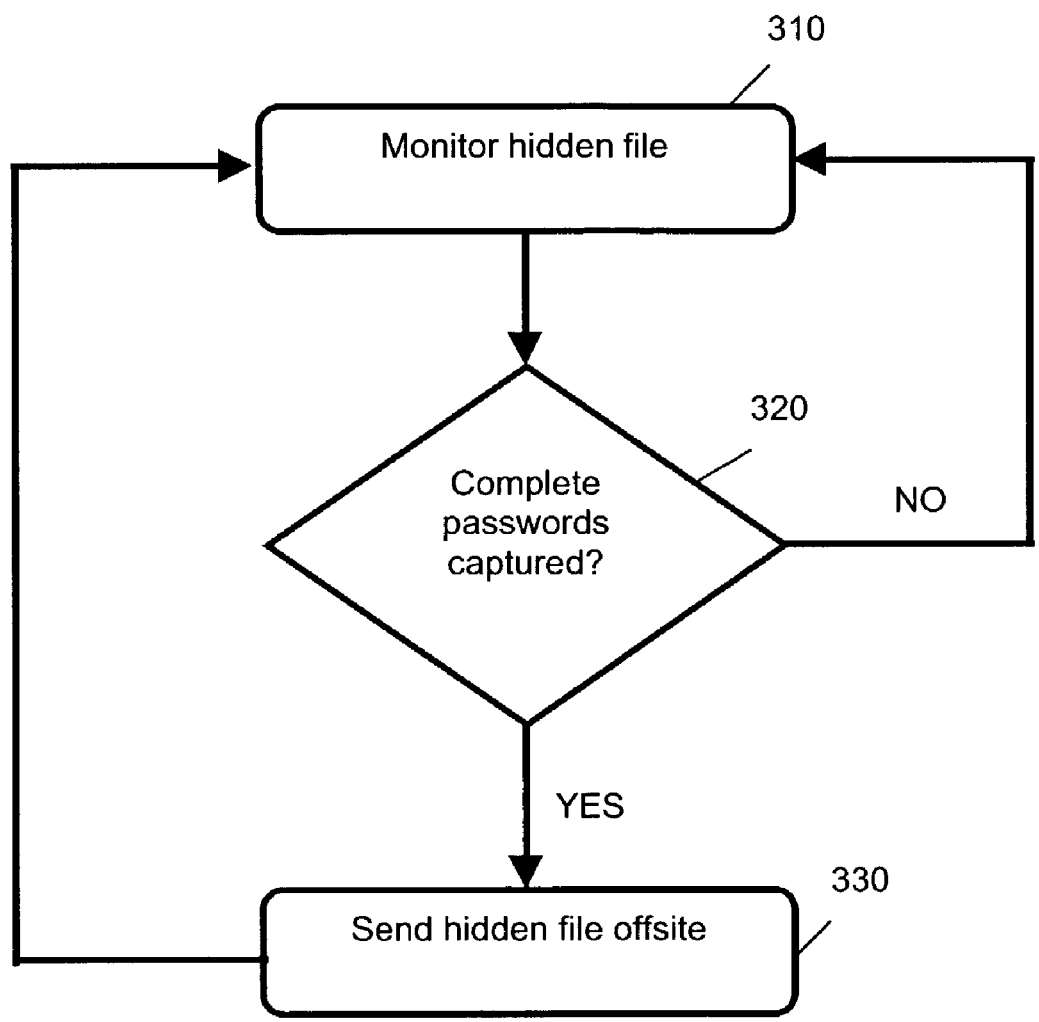
FIG. 3 is a flowchart representing steps in how malicious code can asynchronously collate passwords and transmit these passwords to remote machines.

FIG. 3 represents steps involved in collating and transmitting captured passwords to other machines. Malicious code may perform this step to transmit captured passwords to a third party system.

In step 310, a hidden file, in which keyboard entries are captured, is continuously monitored. In step 320, a determination is made concerning whether complete passwords have been captured. If no complete passwords have been captured, processing returns to step 310, in which the hidden file continues to be monitored.

If complete passwords have been captured, processing continues to step 330, in which the hidden file is transmitted "offsite", to a remote machine. Processing then continues at step 310, in which the hidden file continues to be monitored.

Reactive Protection Technique

An agent (that is, a background program or daemon), when initially executed, audits any software (or chain of programs) hooked into the system-wide keyboard message loop. A process identifier (or list of programs) can be stored in a local file along with the program location, an appropriate date-stamp and any additional data required for identification purposes, such as the checksum or size of the thread memory owned by the process. This local file constitutes an audit list of such software, and can be thought of as a snapshot of the current list of hooked processes in the keyboard message loop.

The agent's ongoing role is to run an audit of keyboard-hooking programs on a regular basis. During each cycle, after the agent compares a newly produced audit list with the details initially stored in the original audit list, the agent generates an alert if any suspicious new hooks are installed.

Any malicious code attempting to establish itself in the keyboard hook chain is detected, if this code occurs after installation of the agent. The agent, by a process of elimination, is able to immediately locate the owner of the hook program (that is, the responsible executable file) and delete this file from storage. Further, the file or module name of this executable file and process checksum can be added to the "hit" list for future comparison with detected processes.

A message box advising the user that the operating system should be restarted ensures a "clean" state once more. The user might then further safeguard their system by changing all passwords. The agent continues to execute, thus maintaining protection on the relevant machine.

Figure 4:
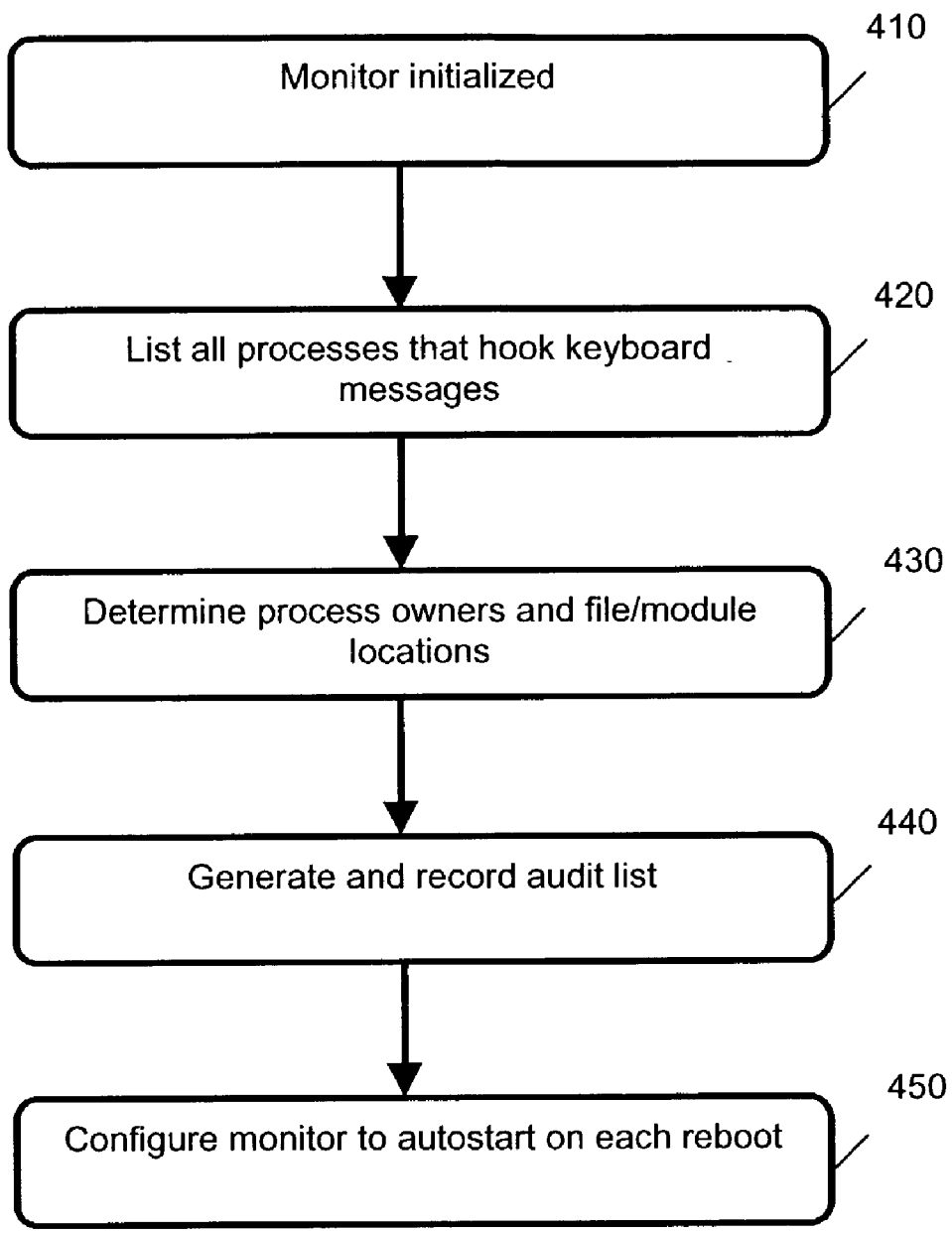
FIG. 4 is a flowchart representing steps involved in installing a monitor process used in a reactive procedure for shielding password entries from malicious code.

FIG. 4 represents steps that are performed when a monitor process is installed on a machine.

In step 410, the monitor is initialised on a machine. In step 420, all processes that hook keyboard messages are determined by the monitor. In step 430, process owners, file/module locations and checksums are determined for each of the listed processes of step 420.

In step 440, an audit list is generated and records all determined process owners, file/module locations and checksums. In step 450, the monitor is configured to automatically start on each reboot of the machine on which the monitor is initialized. This installation procedure allows the monitor, now installed, to operate as intended.

Figure 5:
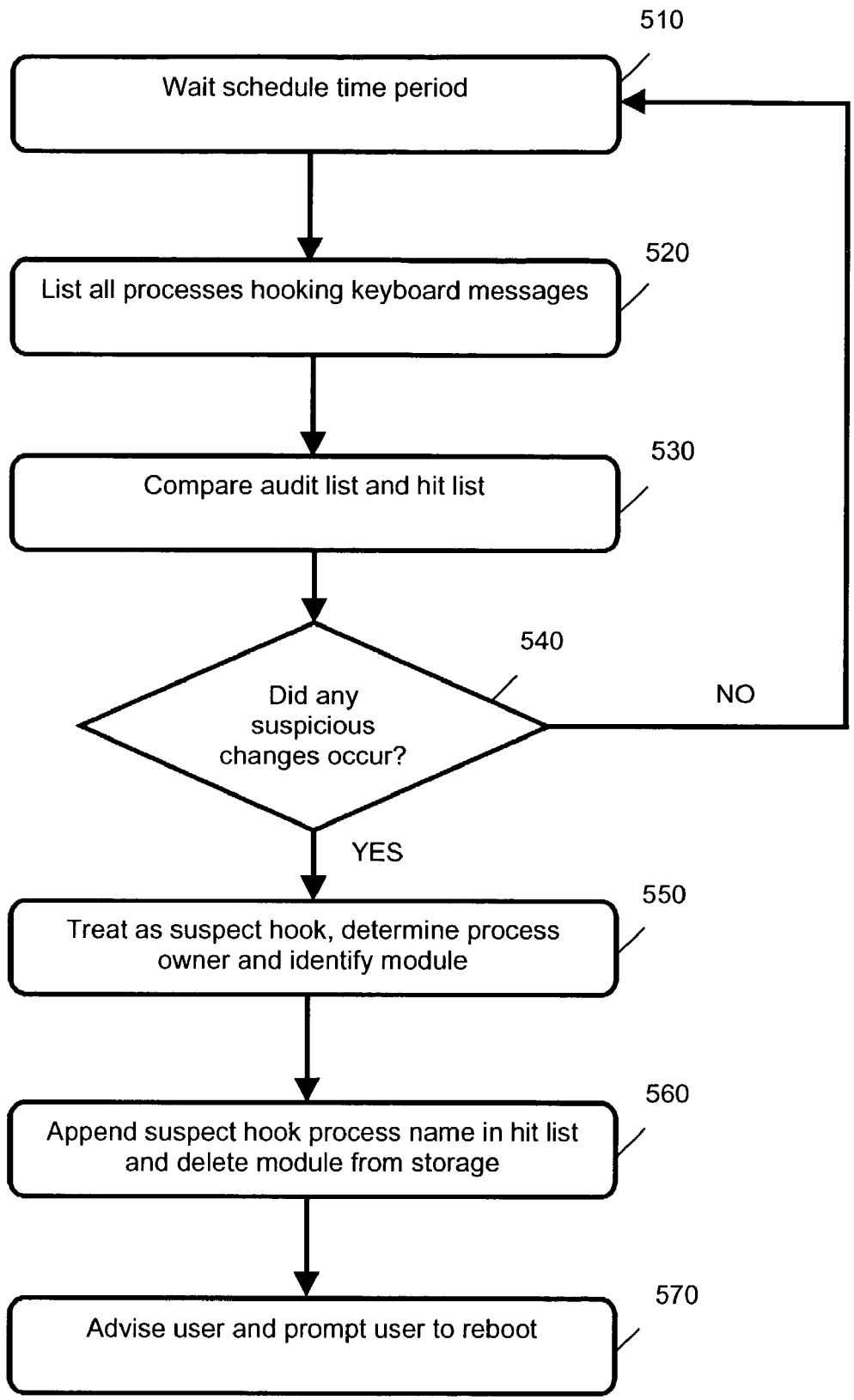
FIG. 5 is a flowchart representing steps involved in how the monitor process of FIG. 4 operates in a reactive procedure to shield password entries from malicious code.

A monitoring process performed by the monitoring module is now described, with reference to FIG. 5. In step 510, the monitoring module waits a predetermined time period. After this period, all processes that hook keyboard messages are listed in step 520, in addition to the initially listed processes, which are determined as described with reference to FIG. 4.

In step 530, a comparison is made of the previous audit list and a hit list. The hit list is a list of known malicious keyboard-hooking processes, or the representative programs that contain such a process. The hit list has the same format as an audit list, that is, the hit list will contain identifying data such as a process name and checksum. The hit list is updated whenever new malicious processes are identified.

In step 540, a determination is made whether any suspicious changes occurred by virtue of exclusion in the audit list or inclusion in the hit list. If no suspicious changes occurred, processing returns to step 510, to wait a predetermined period before monitoring again for any changes. If suspicious processes are observed, processing proceeds to step 550. In step 550, suspicious hooks are treated as such.

A determination is made of the process owner and the module's identity. In step 560, the name (and other identifying data) of the suspect hook is appended to the list of names in the hit list. The relevant module is also deleted from storage if positively identified. In step 570, the user is advised accordingly, and prompted to reboot the machine.

A benefit of reactive protection is a small "footprint" on the local machine, and a single point of execution.

The reactive nature of the monitoring module assumes that malicious keyboard hook code does not check along the chain for other hooks with the intention of disabling them. If this possibility is a concern, then a proactive protection technique as described directly below, is desirably implemented.

Proactive Protection Technique

The proactive technique differs from the reactive technique described above in that the proactive techniques uses a server-deployed name-list array and a watchdog module to safeguard the monitoring module.

The proactive technique prevents any other software maliciously installed on the system with the purpose of capturing the keyboard entries from connecting (that is, hooking) into the system-wide keyboard message loop. By contrast, the reactive technique involves simply warning of a possible malicious hook, and deleting the responsible execution module from the local storage if positively identified.

As a precaution, the proactive technique attempts to cripple the suspect hook by locating the suspect hook's entry point. The entry point in memory is the beginning storage address of the suspected malicious code. This knowledge allows the invention to locate and remove the code. A "subroutine return" opcode is written to this suspect hook. Furthermore, there is a separate watchdog process, which monitors the keyboard-hook audit process. This audit process runs checksums on the watchdog process to ensure that the watchdog process is not compromised.

Figure 8:
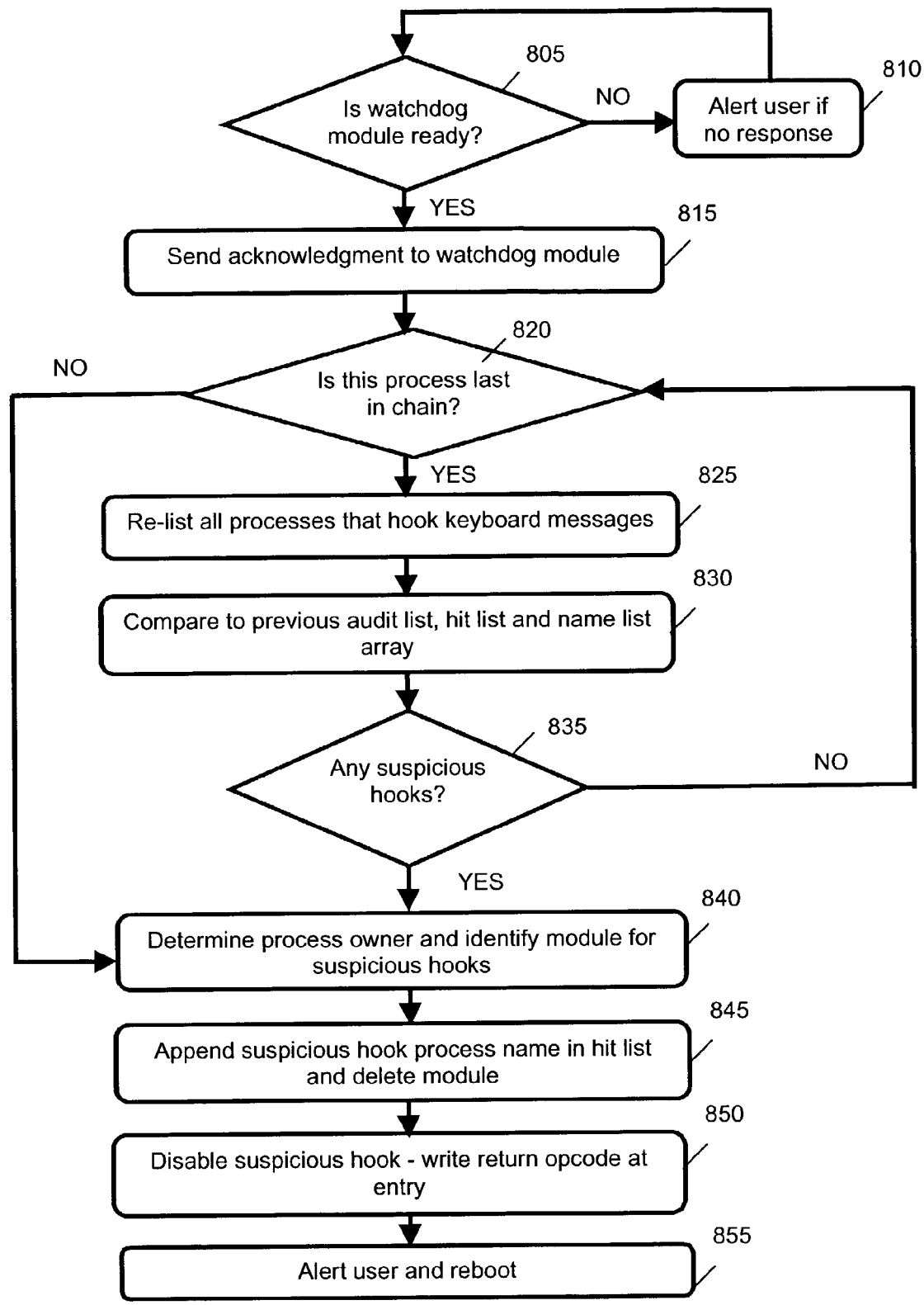
FIG. 8 is a flowchart representing steps involved in a dummy keyboard hook process hook process in the monitoring module of FIG. 6.
Figure 9:
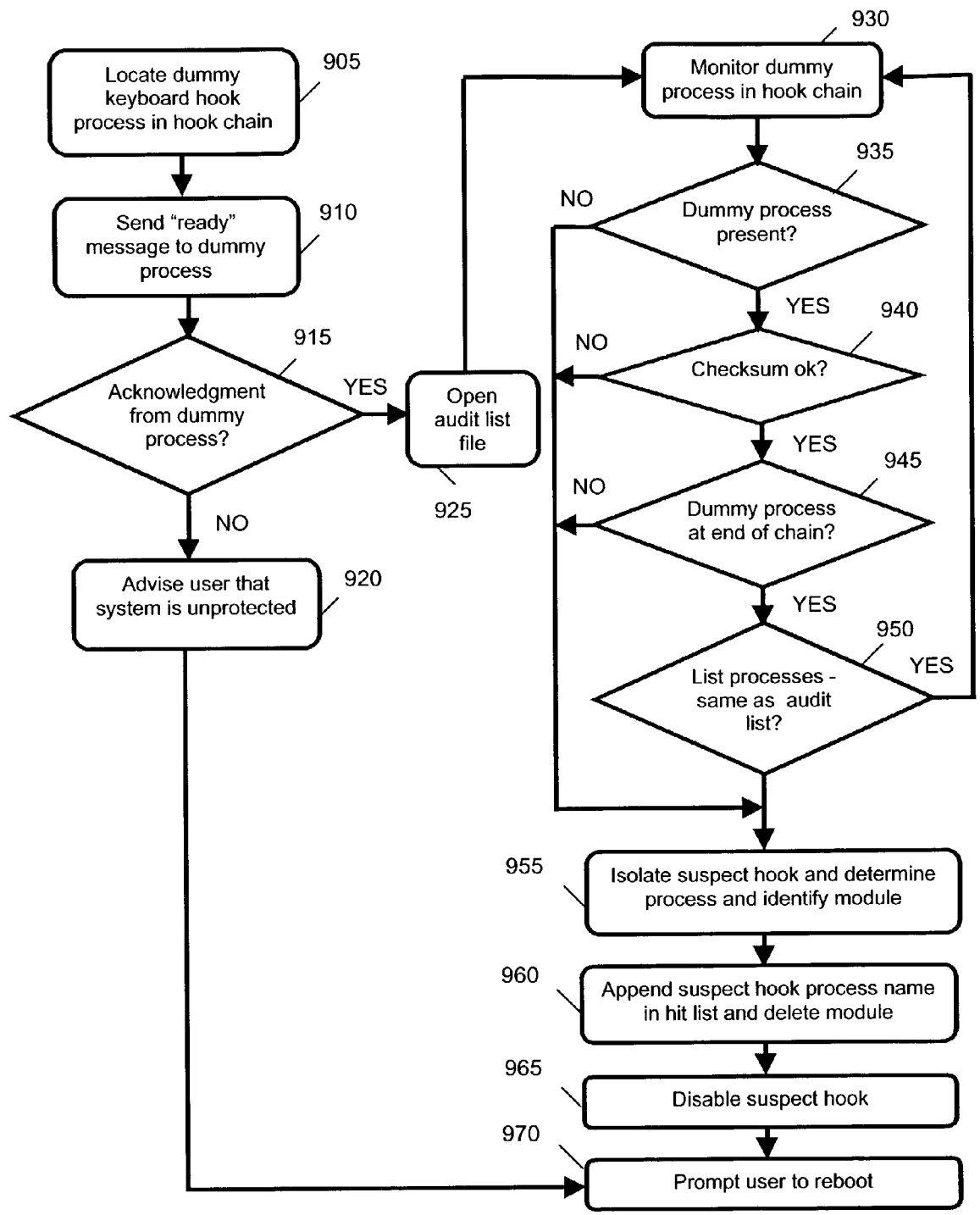
FIG. 9 is a flowchart representing steps involved in the operation of the watchdog module of FIG. 7 shielding password entries from malicious code.

The keyboard-hook audit is an administrative matter performed by the dummy keyboard-hook process (refer to FIG. 8, steps 820 to 835). This audit determines if the execution process in which the dummy keyboard-hook process resides is the last in the chain linearly (that is, the last process in the keyboard message loop to receive keyboard input notifications). Only at the "end of the chain" can enumeration of all processes ahead the dummy keyboard-hook process be reliably performed. If an extra process appears in the chain, then such an enumeration will isolate this process.

By comparing enumerated process names and checksums of their code fragments to the audit list, any discrepancies can be determined. Furthermore, if any process compares (in name or checksum) to any entry in the hit list, then recognition of a suspect hook is assured, and remediation can take place (refer to FIG. 8, steps 840 to 855).

The watchdog process serves as a monitoring mechanism for the aforementioned dummy keyboard-hook process. The watchdog process confirms that the dummy keyboard-hook is active and continues to track its position in the keyboard hook chain, running periodic checksums on the process, and performing a process enumeration, comparing these indicators to the audit list/hit list/name list array. Clearly, the watchdog process duplicates the monitoring actions of the dummy keyboard-hook process, and by doing so the watchdog process acts as a "failsafe" mechanism should any malicious code manage to evade detection by the dummy keyboard-hook and attempt to defeat the dummy keyboard-hook process For additional security, the watchdog module is not deployed with the main software components, but rather pushed from a server that has a program dedicated to this task. The program is pushed using TCP/IP, a standard network protocol. Other network protocols which offer the facility of data transfer between network hosts, such as FTP, can also be used.

The server-side monitor listens for instances of the client monitor. On acknowledgment, a server-side monitor pushes to a workstation (that is, the client) an encrypted copy of the watchdog module and a file listing, called the name-list array, the "known" (that is, acceptable) applications permitted to hook into the keyboard message loop. The client monitor (that is, the "agent") running on the client workstation receives the watchdog module, decrypts the watchdog module, and saves the watchdog module using a random file name to evade external detection. File attributes of the randomly-named watchdog module are designed to protect the module from accidental deletion.

The agent lists the currently hooked processes listening to keyboard messages. The agent identifies each process owner to a module level (that is, file level) and notes the order of processes in the chain, assuming that there is more than one process hooked. This data is captured to a file, referred to as an audit list.

The agent then reconfigures itself as a "dummy" keyboard hook process and installs itself into the system keyboard message loop. The dummy hook can ensure that no other hooks can be installed behind the dummy hook. The watchdog process can identify the dummy keyboard-hook process (by looking for the process by module name, or by scanning for a unique signature) and thus determine its position in the list of keyboard-hook processes.

From this information, the watchdog process can determine if the order (that is, its linear position) has changed. This involves enumerating the hooks and confirming that the dummy keyboard-hook module is the last in the chain. If another hook process is determined to be positioned after the dummy keyboard-hook process, then the latter can deinstall (unhook) and reinstall (re-hook) to effectively become the "last" hook process once more. At this point a determination is made whether the other added hook is suspicious or not. This technique works with operating systems (such as Microsoft Windows™) that use the threaded-execution model. Variations are allowable to adapt the technique for other operating systems, such as UNIX operating systems.

Figure 6:
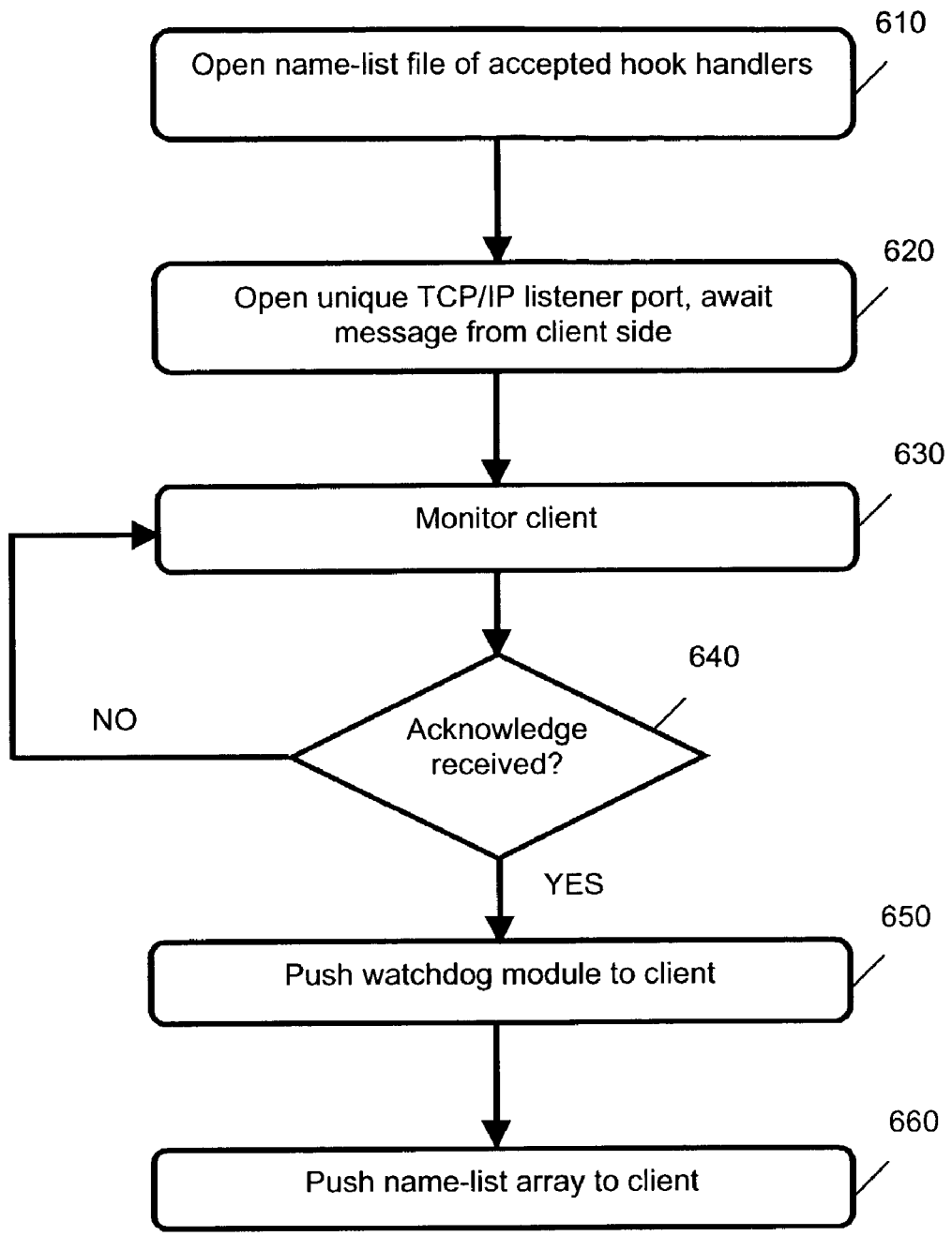
FIG. 6 is a flowchart representing steps involved in installing (at the server-side) a monitoring module used in a proactive procedure for shielding password entries from malicious code.

FIG. 6 represents steps involved in installing the monitoring module. In step 610, a name-list array file of accepted hook handlers is opened. These hook handlers are identified the first time the invention is installed. All of the keyboard-hook processes are compared to a list of known malicious keyboard-hook processes (that is, the hit list), in much the same manner as a computer-virus scanning engine compares to "bad" signature sequences within blocks of code or data.

An attempt can be made to identify the process using this technique, or by running a checksum of the thread memory owned by the process. If none are found, the existing list of processes is assumed to have no malicious processes. Conversely, the name-list array file can be considered the "reverse" of the hit list, in that the name list array file contains a list of known software that hooks into the keyboard message loop for non-malicious purposes. The list contains identifying characteristics such as checksums for each entry and, to extend the analogy of virus signatures, the list is updated and maintained accordingly.

In step 620, a unique TCP/IP listener port is opened, and a message from the client's side is awaited. In step 630, the client is monitored, and in step 640, a determination is made as to whether a valid acknowledgment is received (for example, by comparing a predetermined set of numbers or sequence of characters).

If no acknowledgment is received, the client continues to be monitored, as per step 630. If an acknowledgment is received, processing continues at step 650, in which a watchdog module is pushed to the client. In step 660, a name-list array is pushed to the client. The installation procedure is thus complete.

Figure 7:
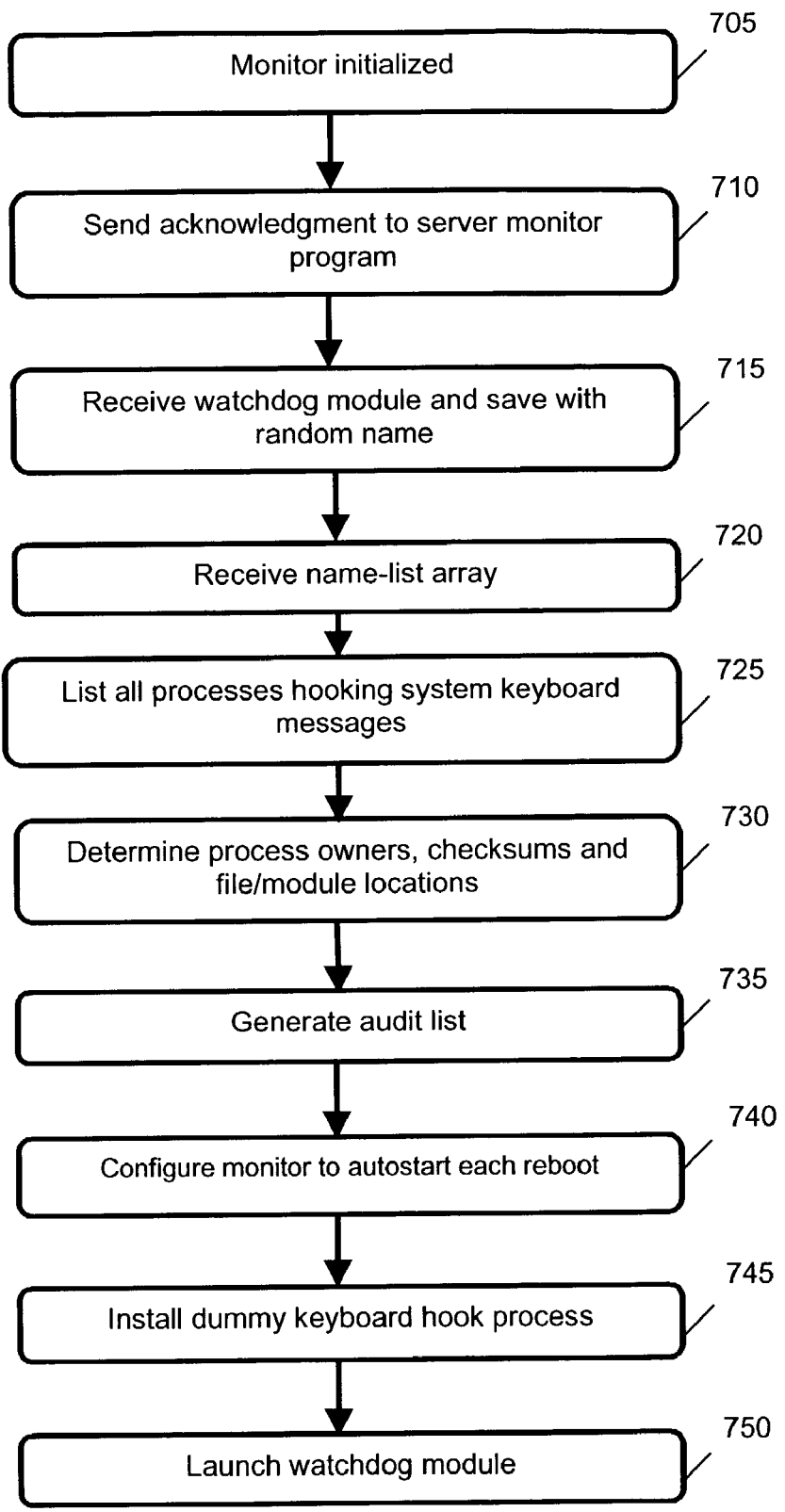
FIG. 7 is a flowchart representing steps involved in installing (at the client side) a watchdog module used in a proactive procedure for shielding password entries from malicious code.

FIG. 7 represents steps involved in the operation of the proactive monitoring module. In step 705, the monitoring module is initialised on a machine. In step 710, acknowledgment is sent to the server monitor program. In step 715, the watchdog module is received, and saved with a random name. In step 720, a name-list array file is received. In step 725, all processes that hook system keyboard messages are listed. In step 730, a determination is made of process owners, checksums and file/module locations, in respect of the listed processes that hook system keyboard messages.

In step 735, an audit list of relevant processes is generated. In step 740, the monitor is configured to automatically start on each reboot. In step 745, a dummy keyboard hook process is installed and, in step 750, the watchdog module is launched.

FIG. 8 represents steps involved in the ongoing operation of the proactive monitoring module, referred to herein as the dummy keyboard-hook process. In step 805, a determination is made to whether the watchdog module is ready. If so, the user is alerted if there is no response (after a programmable predetermined duration), in step 810. Once alerted, processing returns to step 805. If the watchdog module is ready, an acknowledgment is sent to the watchdog module in step 815.

In step 820, a determination is made whether the dummy process is the last in the process chain. If the process is not the last in the process chain, processing jumps to step 840, which is described below. If the process is the last in the process chain, all processes that hook keyboard messages are relisted in step 825. In step 830, the listed processes of step 825 are compared with those of the previously generated audit list, hit list and name-list array.

In step 835, a determination is made as to whether there are any suspicious hooks. If no suspicious hooks exist, processing returns to step 820. If, however, a suspicious hook does exist, the process owner and module is determined in step 840. In step 845, the suspicious hook process name (together with other identifying data such as a checksum) is appended to the hit list, and the relevant module (file) is deleted from storage. In step 850, this suspicious hook process is disabled, by virtue of a subroutine return opcode written at the hook's entry point. In step 855, the user is alerted accordingly and prompted to reboot the machine.

In step 905, the watchdog process locates the dummy keyboard hook process in the hook chain. In step 910, a "ready" message is sent to the dummy process. In step 915, a determination is made as to whether acknowledgment has been received back from the dummy process. If an acknowledgment has been received, the audit list is opened in step 925. If no acknowledgment is received, a user is advised accordingly that the system is unprotected in step 920, and is prompted to reboot, as per step 970.

Once the audit list is opened in step 925, the dummy keyboard hook process in the hook chain is monitored in step 930. In step 935, a determination is made whether the dummy hook process is present. If so a determination is made as to whether the associated checksum is correct in step 940. In step 945, a determination is made whether the dummy process is at the end of the process chain. If the dummy process is not present in step 935, or the checksum is not correct in step 940, or the dummy process is not at the end of the chain in step 945, a suspect hook is assumed to be present and isolated to determine the associated process and module identification in step 955.

Additionally, in step 950, a determination is made as to whether a current enumeration of hooked processes compare to the audit list. If the same processes are on the audit list, processing returns to step 930 in which the dummy process is monitored. If the enumerated processes do not match the audit list, processing reverts to step 955, as described above.

In step 960, the suspect hook process name is appended to the hit list, and the identified module deleted. In step 965, the suspect hook process is disabled by writing a "subroutine return" opcode at its entry point, and in step 970 the user is prompted to reboot once the suspect hook is disabled in step 965.

Computer Hardware and Software

Figure 10:
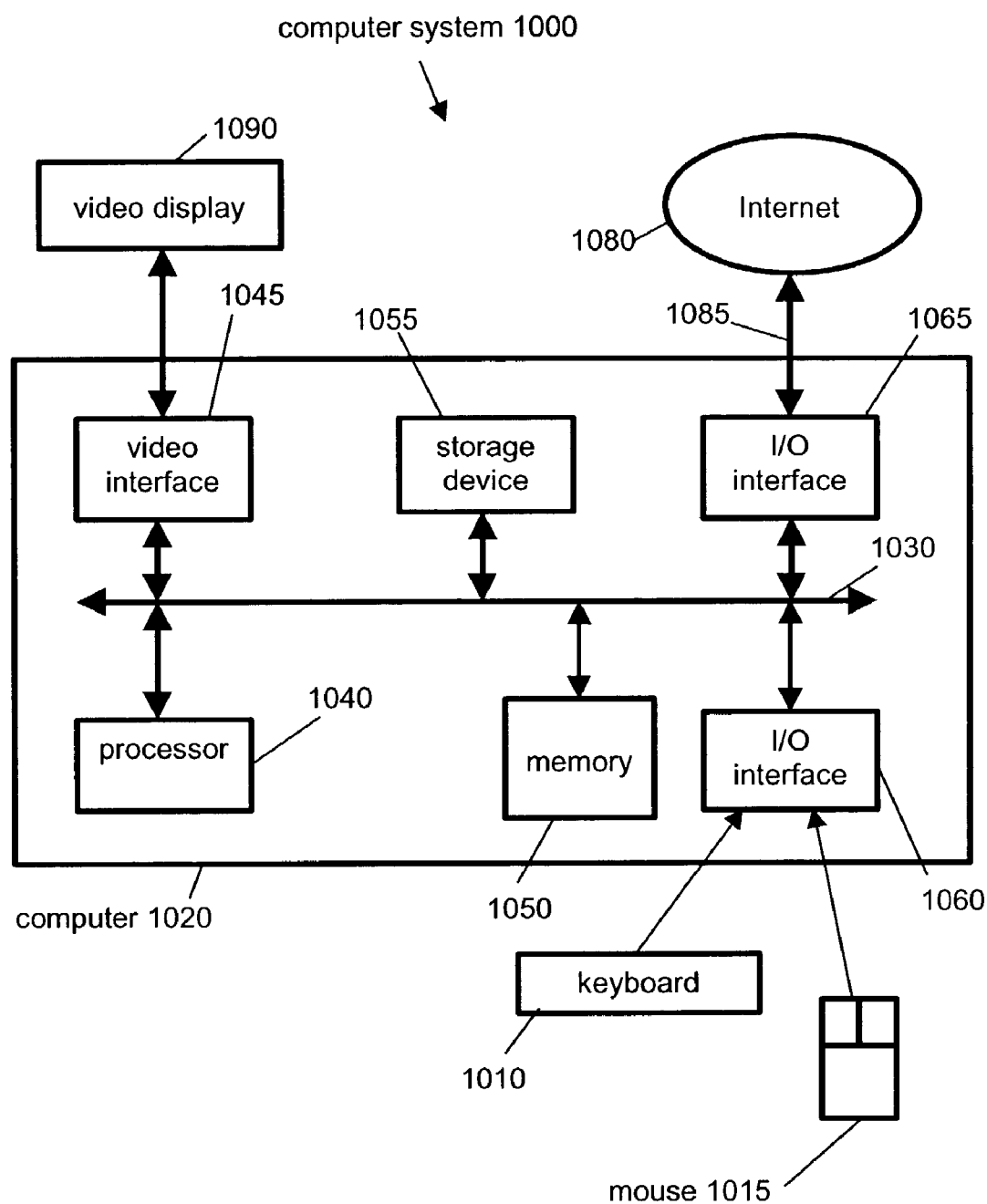
FIG. 10 is a schematic representation of a computer system suitable for performing the techniques described with reference to FIGS. 1 to 9.

FIG. 10 is a schematic representation of a computer system 1000 on which the techniques described herein can be performed. The computer system 1000 is provided for executing computer software that is programmed to assist in performing the described techniques. This computer software executes under a suitable operating system installed on the computer system 1000.

The computer software involves a set of programmed logic instructions that are able to be interpreted by the computer system 1000 for instructing the computer system 1000 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system.

The computer software is programmed in a manner that involves various software components, or code means, that perform particular steps in the process of the described techniques.

The components of the computer system 1000 include: a computer 1020, input devices 1010, 1015 and video display 1090. The computer 1020 includes: processor 1040, memory module 1050, input/output (I/O) interfaces 1060, 1065, video interface 1045, and storage device 1055.

The processor 1040 is a central processing unit (CPU) that executes the operating system and the computer software executing under the operating system. The memory module 1050 includes random access memory (RAM) and read-only memory (ROM), and is used under direction of the processor 1040.

The video interface 1045 is connected to video display 1090 and provides video signals for display on the video display 1090. User input to operate the computer 1020 is provided from input devices 1010, 1015 consisting of keyboard 1010 and mouse 1015. The storage device 1055 can include a disk drive or any other suitable non-volatile storage medium.

Each of the components of the computer 1020 is connected to a bus 1030 that includes data, address, and control buses, to allow these components to communicate with each other via the bus 1030.

The computer system 1000 can be connected to one or more other similar computers via a input/output (I/O) interface 1065 using a communication channel 1085 to a network 1080, represented as the Internet.

The computer software program may be provided as a computer program product, and recorded on a portable storage medium. In this case, the computer software program is accessed by the computer system 1000 from the storage device 1055. Alternatively, the computer software can be accessed directly from the network 1080 by the computer 1020. In either case, a user can interact with the computer system 1000 using the keyboard 1010 and mouse 1015 to operate the programmed computer software executing on the computer 1020.

The computer system 1000 is described for illustrative purposes: other configurations or types of computer systems can be equally well used to implement the described techniques. The foregoing is only an example of a particular type of computer system suitable for implementing the described techniques.

A method, a computer system and computer software for password protection are described herein in the context of protecting keyboard-entered passwords from observation by malicious code. Two related techniques are described, each of which relies on a common algorithmic approach.

While password protection is described specifically in terms of keyboard-entered passwords, the described techniques also apply to passwords entered in computer systems using other techniques, such as via a voice interface. For non-keyboard interfaces, attention is similarly directed to processes that are able to read the interface. For example, if the interface is a microphone, processes that can read data sent from the microphone is checked for changes and execution order.

Various alterations and modifications can be made to the techniques and arrangements described herein, as would be apparent to one skilled in the relevant art.

We claim:

1. A method for protecting passwords entered at an interface, the method comprising the steps of:
   determining processes that hook interface messages;
   comparing the determined processes with members of a process list;
   identifying a suspicious process as a result of the comparison of the determined processes and the process list;
   determining a module corresponding with the identified suspicious process;
   receiving from a server a watchdog process;
   determining the order in which the interface-hooking processes access input entries from the interface:
   installing a dummy interface-hooking process; and
   preventing any further processes from hooking interface entries.

2. A method as claimed in claim 1, further comprising the step of deleting the determined module.

3. The method as claimed in claim 1, further comprising the step of appending an identified suspicious process to the process list.

4. The method as claimed in claim 1, further comprising the step of determining an entry point of the suspicious process and writing to the entry point to disable the suspicious process.

5. The method as claimed in claim 1, wherein the watchdog file is encrypted.

6. The method as claimed in claim 5, further comprising the step of decrypting the watchdog process.

7. The method as claimed in claim 6, further comprising the step of saving the decrypted watchdog process with a random file name.

8. The method as claimed in claim 1, further comprising the step of saving the received watchdog process with file attributes intended to disrupt unintentional deletion of the watchdog process.

9. The method as claimed in claim 1, further comprising the step of determining whether the suspicious process is the last process able to access input entries from the interface.

10. A computer-readable storage medium having stored therein instructions for performing a method of protecting passwords entered at an interface, the method comprising the steps of:
   determining processes that hook interface messages;
   comparing the determined processes with members of a process list;
   identifying a suspicious process as a result of the comparison of the determined processes and the process list;
   determining a module corresponding with the identified suspicious process;
   receiving from a server a watchdog process;
   determining the order in which the interface-hooking processes access input entries from the interface;
   installing a dummy interface-hooking process; and
   preventing any further processes from hooking interface entries.

11. The computer-readable storage medium as claimed in claim 10, wherein said performed method further comprising deleting the determined module.

12. A computer system for protecting passwords entered at an interface of the computer system, the system comprising:
   means for determining processes that hook interface messages;
   means for comparing the determined processes with members of a process list;
   means for identifying a suspicious process as a result of the comparison of the determined processes and the process list;
   means for determining a module corresponding with the identified suspicious process;
   means for receiving from a server a watchdog process;
   means for determining the order in which the interface-hooking processes access input entries from the interface;
   means for installing a dummy interface-hooking process; and
   means for preventing any further processes from hooking interface entities.

13. The computer system as claimed in claim 12, wherein said performed method further comprising means for deleting the determined module.

14. A method for protecting passwords entered at an interface of a computer system, the method comprising the steps of:
   a) generating, by at least one agent of the computer system, a process list of interlace-hooking processes on the computer system, wherein the process list includes interface-hooking processes existing on the computer system during an agent initialization interval, so that the at least one agent deems such processes as initial interface-hooking processes;
   b) identifying, by the at least one agent, interface-hooking processes existing on the computer system at a time after the agent initialization interval;
   c) identifying a suspicious process from among the processes identified in step b), wherein interface-hooking processes of the computer system are assigned a sequence having a beginning and an end for accessing entries input from the interface;
   d) installing, at during the agent initialization interval, a dummy interface-hooking process for accessing the entries input from the interlard, wherein the dummy interface-hooking process is assigned to the end of the interface-hooking sequence, wherein the identifying of the suspicious process includes;
   d1) comparing i) the initial process list and ii) the processes identified in step b); and
   d2) determining, for the processes identified in step b), a sequence of accessing entries input from the interface, wherein if one of the processes identified in step b) is assigned to access the interface entries after the dummy interface-hooking process then the at least one agent identifies such a one of the processes as a suspicious process; and
   e) determining a module corresponding with the identified suspicious process.

15. The method of claim 14, wherein if one of the processes identified in step b) is not on the initial process list, then the at least one agent identifies such a one of the processes as a suspicious process.

16. The method of claim 14, comprising the step of:
   preventing such a process identified as a suspicious process from hooking interface entries.

17. The method of claim 14, comprising the step of:
   deleting the determined module.

18. The method of claim 14, comprising the steps of:
   receiving instructions for a watchdog process; and
   saving the instructions for the watchdog process with a random file name.

19. A computer-readable storage medium having stored therein instructions for performing a method of protecting passwords entered at an interface, the method comprising the steps of:
   a) generating, by at least one agent of the computer system, a process list of interface-hooking processes on the computer system, wherein the process list includes interface-hooking processes existing on the computer system during an agent initialization interval, so that the at least one agent deems such processes as initial interface-hooking processes;
   b) identifying, by the at least one agent, interface-hooking processes existing on the computer system at a time after the agent initialization interval;
   c) identifying a suspicious process from among the processes identified in step b), wherein interface-hooking processes of the computer system are assigned a sequence having a beginning and an end for accessing entries input from the interface;
   d) installing, during the agent initialization interval, a dummy interface-hooking process for accessing the entries input from the interface, wherein the dummy interface-hooking process is assigned to the end of the interface-hooking sequence, wherein the identifying of the suspicious process includes:

d1) comparing i) the initial process list and ii) the processes identified in step b); and d2) determining, for the processes identified in step b), a sequence of accessing entries input from the interface, wherein if one of the processes identified in step b) is assigned to access the interface entries after the dummy interface-hooking process, then the at least one agent identifies such a one of the processes as a suspicious process; and e) determining a module corresponding with the identified suspicious process.

20. A computer system comprising:

a processor; and a storage device connected to the processor, wherein the storage device has stored thereon an passwords protecting program for controlling the processor, and wherein the processor is operative with the program to execute the program for performing the steps of:

a) generating, by at least one agent of the computer system, a process list of interface-hooking processes on the computer system, wherein the process list includes interface-hooking processes existing on the computer system during an agent initialization interval, so that the at least one agent deems such processes as initial interface-hooking processes;

b) identifying, by the at least one agent, interface-hooking processes existing on the computer system at a time after the agent initialization interval;

c) identifying a suspicious process tom among the processes identified in step b), wherein interface-hooking processes of the computer system are assigned a sequence having a beginning and an end for accessing entries input from the interface;

d) installing, during the agent initialization interval, a dummy interface-hooking process for accessing the entries input from the interface, wherein the dummy interface-hooking process is assigned to the end of the interface-hooking sequence, wherein the identifying of the suspicious process includes:

c1) comparing i) the initial process list and ii) the processes identified in step b); and c2) determining, for the processes identified in step b), a sequence of accessing entries input from the interface, wherein if one of the processes identified in step b) is assigned to access the interface entries after the dummy interface-hooking process, then the at least one agent identifies such a one of the processes as a suspicious process; and e) determining a module corresponding with the identified suspicious process.

* * * * *